United States Patent
Yasunaga et al.

(10) Patent No.: US 7,151,069 B2
(45) Date of Patent: Dec. 19, 2006

(54) MANUFACTURING PROCESSES OF CATALYST LAYER FOR FUEL CELL

(75) Inventors: Yoshinobu Yasunaga, Kyoto (JP); Shuji Hitomi, Kyoto (JP)

(73) Assignee: Japan Storage Battery Co., Ltd., Kyoto (JP)

( * ) Notice: Subject to any disclaimer, the term of this patent is extended or adjusted under 35 U.S.C. 154(b) by 0 days.

(21) Appl. No.: 10/892,157

(22) Filed: Jul. 16, 2004

(65) Prior Publication Data

US 2005/0026772 A1    Feb. 3, 2005

(30) Foreign Application Priority Data

Jul. 16, 2003  (JP) ................... P. 2003-275111
Oct. 31, 2003  (JP) ................... P. 2003-372468

(51) Int. Cl.
*H01M 4/88* (2006.01)
*H01M 4/86* (2006.01)
*H01M 4/90* (2006.01)
*B01J 21/18* (2006.01)
*B01J 23/00* (2006.01)

(52) U.S. Cl. ............ 502/101; 502/183; 502/184; 502/185; 502/325; 502/328; 502/329; 502/330; 502/331; 502/337; 502/338; 502/339; 429/40; 429/41; 429/42; 429/43; 429/44

(58) Field of Classification Search ............ 502/101, 502/183–185, 325, 328–331, 337–339; 429/40–44
See application file for complete search history.

(56) References Cited

U.S. PATENT DOCUMENTS

| | | | |
|---|---|---|---|
| 4,328,086 A | * | 5/1982 | Takenaka et al. ............ 204/296 |
| 4,457,823 A | * | 7/1984 | LaConti et al. ............ 204/282 |
| 5,399,184 A | | 3/1995 | Harada |
| 6,344,291 B1 | | 2/2002 | Hitomi |
| 6,528,201 B1 | | 3/2003 | Hitomi |

(Continued)

FOREIGN PATENT DOCUMENTS

JP    60-135434    *    7/1985

(Continued)

OTHER PUBLICATIONS

"Development of Ultra-low Pt—Ru Binary Alloy Loading Gas Diffusion Electrode for PEFC" pp. 116-117 by Naohiro Tsumura, et al., presented at the 41st Battery Symposium in Japan, Nov. 20-22, 2000.

(Continued)

*Primary Examiner*—J. A. Lorengo
*Assistant Examiner*—Patricia L. Hailey
(74) *Attorney, Agent, or Firm*—Sughrue Mion, PLLC (57) ABSTRACT

The feature of the process for ultra-low alloy catalyst loading electrode according to this invention is to reduce its alloy formation period of aging process subsequent to hydrogen reduction process of catalyst ions after ion exchange process of proton for their ions in the cluster of the polymer electrolyte on the surface of the carbon powder. The process is able to drastically shorten the aging time with temperature rise beyond 200° C. up to 400° C. under hydrogen atmosphere for the formation of alloy catalyst, for example Pt—Ru binary by the additional processes of pre-treatment of substituting $K^+$, $Na^+$, $Li^+$, $Rb^+$, $Cs^+$, $Mg^{2+}$, $Ca^{2+}$, $Ba^{2+}$, $Fe^{2+}$, $Sr^{2+}$, $Ra^{2+}$, $Cu^{2+}$, $Ag^+$, $Zn^{2+}$, $Ni^{2+}$, or $Co^{2+}$ for proton before the hydrogen reduction process. The further post-treatment of substituting $K^+$, $Na^+$, $Li^+$, $Rb^+$, $Cs^+$, $Mg^{2+}$, $Ca^{2+}$, $Ba^{2+}$, $Fe^{2+}$, $Sr^{2+}$, $Ra^{2+}$, $Cu^{2+}$, $Ag^+$, $Zn^{2+}$, $Ni^{2+}$, or $Co^{2+}$ for proton before the ion exchange process is more preferable. This new process is little harmful to the CO tolerance performance of PEFC.

15 Claims, 8 Drawing Sheets

U.S. PATENT DOCUMENTS

| | | |
|---|---|---|
| 6,576,363 B1 | 6/2003 | Hitomi |
| 6,730,427 B1 | 5/2004 | Hitomi |
| 6,866,960 B1 * | 3/2005 | Tsumura et al. ............... 429/42 |
| 2002/0015878 A1 | 2/2002 | Tsumura et al. |
| 2003/0066763 A1 * | 4/2003 | Watanabe et al. ........ 205/792.5 |

OTHER PUBLICATIONS

"CO Tolerance Performance of Ultra-Low Pt—Ru Binary Alloy Catalyst Loading Gas Diffusion Electrode for PEFC", pp. 570-571, by Naohiro Tsumura, et al., presented at the 42nd Battery Symposium in Japan, Nov. 21-23, 2001.

"Development of New Synthesis Process of Ultra-Low Pt—Ru Binary Alloy Catalyst Loading Gas Diffusion Electrode for PEFC" pp. 180-181, by Yoshinobu Yasunaga, et al., presented at the 44th Battery Symposium in Japan, Nov. 4-6, 2003.

"Development of Ultra-Low Pt—Ru Binary Alloy Catalyst Loading Gas Diffusion Electrode for PEFC", by Naohiro Tsumura, et al., GS News Technical Report, vol. 62 No. 1 Jun. 25, 2003, pp. 21-25.

"Development of New Manufacturing Process of Ultra-Low Pt—Ru Binary Alloy Catalyst Loading Electrode for PEFC", by Yoshinobu Yasunaga, et al., GS News Technical Report, vol. 62 No. 2, Dec. 25, 2003, pp. 68-72.

Yoshinobu Yasunaga, Naohiro Tsumura, Shuji Hitomi, Hideo Yasuda, and Masanori Yamachi; Development of New Synthesis Process of Ultra-Low Pt—Ru Binary Alloy Catalyst Loading Gas Diffusion Electrode for PEFC; The 44th Battery Symposium in Japan, Nov. 4-6, 2003, Sakai, pp. 180-181.

Yoshinobu Yasunaga, Naohiro Tsumura, Shuji Hitomi, Hideo Yasuda, and Masanori Yamachi; Development of New Manufacturing Process of Ultra-Low Pt—Ru Binary Alloy Catalyst Loading Electrode for PEFC; GS News Technical Report, vol. 62, No. 2, Dec. 25, 2003, pp. 68-72.

Swee Chye Yeo and A. Eisenberg; Physical Properties and Supermolecular Structure of Perfluorinated Ion-Containing (Nafion) Polymers; Journal of Applied Science; vol. 21; pp. 875-898; (1977).

* cited by examiner

MANUFACTURING PROCESSES OF CATALYST LAYER FOR FUEL CELL

TECHNICAL FIELD

The present invention relates to manufacturing processes of catalyst layer for fuel cell.

BACKGROUND OF ART

A polymer electrolyte fuel cell (PEFC) is expected as a clean power source for automobiles as well as stationary applications because of its operation at moderate temperature below 100° C. in contrast with another type of fuel cells. The biggest problem to be overcome for its commercialization is high cost. This problem is strongly concerned with the usage of large amount of precious metal of platinum as catalyst particles for electrodes of fuel cells. Therefore, the reduction of loading level of platinum catalyst particles has been required for a long time. A lot of efforts have been made for the minimum loading level of platinum by the development of well-dispersed very small size particles with high utilization. Recently the new technology of ultra-low platinum loading electrode (ULPLE) of which platinum catalyst particle is loaded mainly on the active site where the surface of carbon particle contacts the proton-conductive passage of polymer electrolyte, though the existing catalyst is further loaded on the carbon powder covered by the insulator material of rigid hydrophobic backbones of polymer electrolyte. The loading of platinum catalyst for this novel electrode was to be below 0.1 mg/cm$^2$ with little decrease in the cell performance. PEFC is electric power source using hydrogen as fuel and oxygen in air as oxidant in general. The electrochemical reaction is described below.

Anode: $2H_2 \rightarrow 4H^+ + 4e^-$
Cathode: $O_2 + 4H^+ + 4e^- \rightarrow 2H_2O$ Hydrogen gas as a fuel is produced from reforming natural gas, methane or methanol and contains the small amount of CO as an impurity. The catalyst of Pt in the anode of PEFC is poisoned by the small amount of CO and the cell performance is immediately deteriorated. The phenomenon has been known as CO poisoning effect. The Pt—Ru binary alloy is considered to be CO tolerance catalyst. The manufacturing process of its alloy for ULPLE was the following: (1) formation process of proton conductive polymer resin on carbon materials particles, (2) the ion-exchange reaction process of proton and alloy-composition-element ions in the proton conductive polymer; and (3) reduction process at the lower temperature of 100~200° C. under hydrogen atmosphere followed by the aging process. (U.S. Pat. Nos. 6,344,291, 6,528,201, 6,576,363, and 6,730,427, and The 42$^{nd}$ Battery Symposium in Japan p 570(2001))

The existing Pt—Ru binary alloy catalyst is generally made under high temperature of 1000° C. for the promotion of crystallization of the alloy. However in the case of ULPLE, the reduction temperature of alloy formation process for ULPLE was strictly limited to be below 200° C. even in the case of heat-resistant Nafion, since the material of proton conductive polymer resin tends to be deteriorated at relatively lower temperature because of its lower melting and decomposition temperatures of its material. Therefore the long aging period to keep the high temperature followed by reduction process was needed for the completeness of the alloy formation. The aging time was one month or more for the existing process. The new technology is strongly demanded to shorten the aging of time for practical application.

SUMMARY OF THE INVENTION

The feature of the process for ultra-low alloy catalyst loading electrode according to this invention is to reduce its alloy formation period of aging process subsequent to hydrogen reduction process of catalyst ions after ion exchange process of proton for their ions in the cluster of the polymer electrolyte on the surface of the carbon powder. The process is able to drastically shorten the aging time with temperature rise beyond 200° C. up to 400° C. under hydrogen atmosphere for the formation of alloy catalyst, for example Pt—Ru binary alloy by the additional processes of pre-treatment of substituting $K^+$, $Na^+$, $Li^+$, $Rb^+$, $Cs^+$, $Mg^{2+}$, $Ca^{2+}$, $Ba^{2+}$, $Fe^{2+}$, $Sr^{2+}$, $Ra^{2+}$, $Cu^{2+}$, $Ag^+$, $Zn^{2+}$, $Ni^{2+}$, or $Co^{2+}$ for proton before the hydrogen reduction process. The further post-treatment of substituting $K^+$, $Na^+$, $Li^+$, $Rb^+$, $Cs^+$, $Mg^{2+}$, $Ca^{2+}$, $Ba^{2+}$, $Fe^{2+}$, $Sr^{2+}$, $Ra^{2+}$, $Cu^{2+}$, $Ag^+$, $Zn^{2+}$, $Ni^{2+}$, or $Co^{2+}$ for proton before the ion exchange process is more preferable. This new process is little harmful to the CO tolerance performance of PEFC.

DETAILED DESCRIPTION OF THE INVENTION

The new technology of ultra-low platinum loading electrode (ULPLE) of which platinum catalyst particle is loaded mainly on the active site where the surface of carbon particle contacts the proton-conductive passage of polymer electrolyte, though the existing catalyst is further loaded on the carbon powder covered by the insulator material of rigid hydrophobic backbones of polymer electrolyte. The loading of platinum catalyst for this novel electrode is able to be below 0.1 mg/cm$^2$. The application of Pt—Ru binary alloy for anode of ULPLE was conducted by the following manufacturing process: (1) formation process of proton conductive polymer resin on carbon materials particles, (2) the ion-exchange reaction process of proton for alloy-composition-element ions in the proton conductive polymer; and (3) reduction process at the lower temperature of 200° C. under hydrogen atmosphere followed by the aging process.

Figure 1:
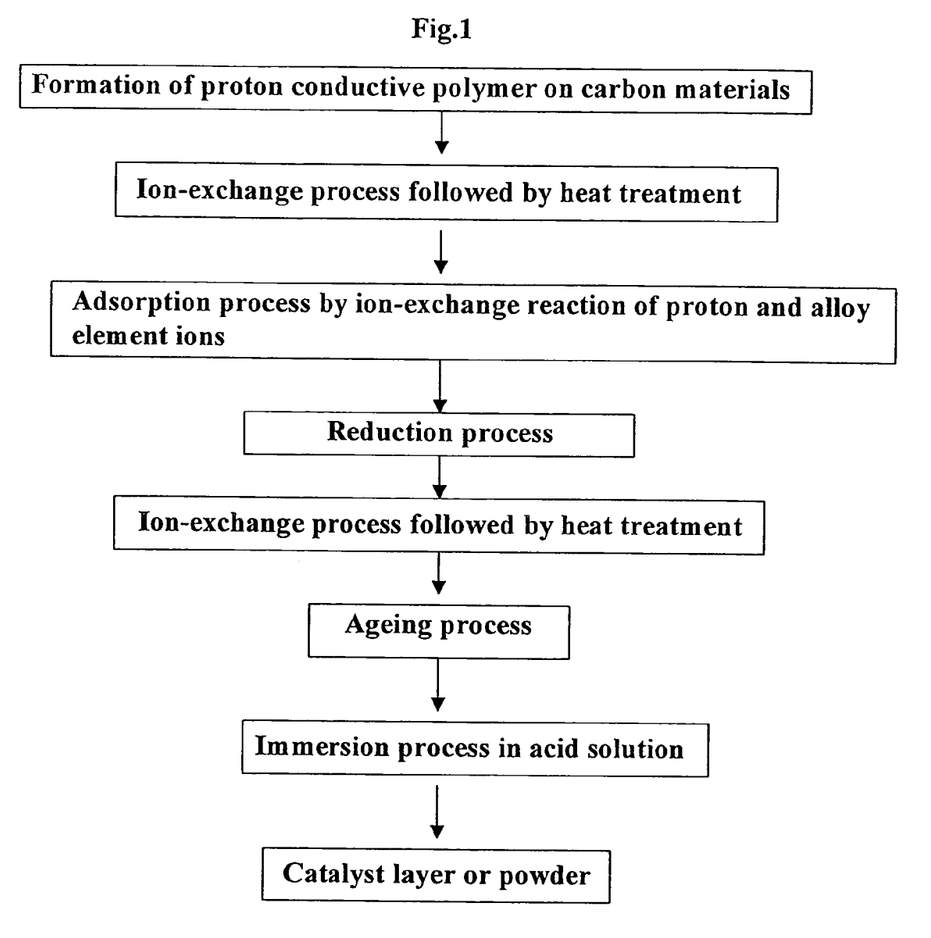
FIG. 1 shows the new manufacturing process according to the present invention.
Figure 2:
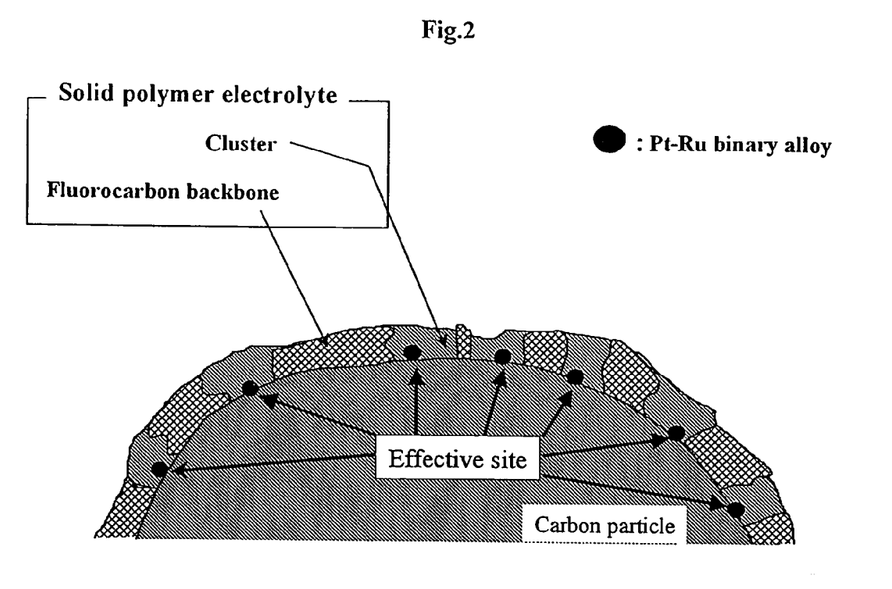
FIG. 2 shows the schematic diagram for the Pt—Ru loading position on carbon powder coated proton conductive polymer resin.
Figure 3:
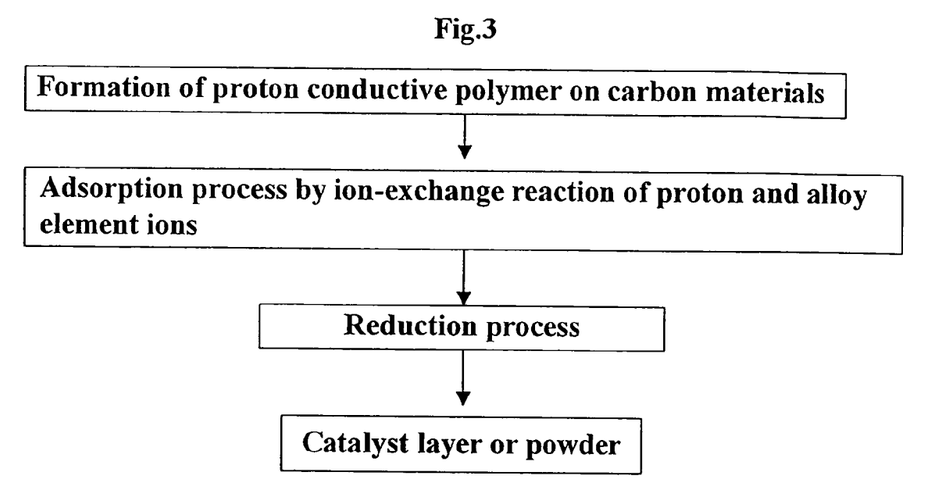
FIG. 3 shows the existing manufacturing process.

However, the reduction temperature of alloy formation process for ULPLE was limited to be low temperature, because the material of proton conductive polymer resin tends to be deteriorated beyond the melting point of its material resulting in the poor performance of PEFC. Even the heat-resistant proton-conductive polymer of Nafion, the maximum temperature was around 180° C. The existing formation process of Pt—Ru binary alloy for anode of ULPLE was obliged to need the period of one month or more to reach the appearance of sufficient CO tolerance performance of PEFC. The new technology according to the present invention was developed by systematic experiments. This invention is able to shorten the aging period by adding the special treatment to the existing manufacturing process. The new process is composed of the following basic process: (1) formation process of proton conductive polymer resin on carbon materials particles, (2) pocess of substituting one element of $K^+$, $Na^+$, $Li^+$, $Rb^+$, $Cs^+$, $Mg^{2+}$, $Ca^{2+}$, $Ba^{2+}$, $Fe^{2+}$, $Sr^{2+}$, $Ra^{2+}$, $Cu^{2+}$, $Ag^+$, $Zn^{2+}$, $Ni^{2+}$, and $Co^{2+}$ ions for proton in the proton conductive polymer resin followed by heat-treatment, (3) ion-exchange reaction process of proton for alloy-composed-element ions in the proton conductive polymer, (4) reduction process under hydrogen atmosphere, (5) process of substituting one element of $K^+$, $Na^+$, $Li^+$, $Rb^+$, $Cs^+$, $Mg^{2+}$, $Ca^{2+}$, $Ba^{2+}$, $Fe^{2+}$, $Sr^{2+}$, $Ra^{2+}$, $Cu^{2+}$, $Ag^+$, $Zn^{2+}$, $Ni^{2+}$, and $Co^{2+}$ ions $H^+$ion in the proton conductive polymer, (6) aging process, and (7) immersion procession in acid solution. The representative flow chart of this invention is shown in FIG. 1. This process is to produce the Pt—Ru binary alloy for ULPLE and the Pt—Ru loading position on carbon powder coated proton conductive polymer resin is shown schematically in FIG. 2. The existing manufacturing process for ULPLE is also shown in FIG. 3. The present invention is to say that the additional processes of treatment of substituting $K^+$, $Na^+$, $Li^+$, $Rb^+$, $Cs^+$, $Mg^{2+}$, $Ca^{2+}$, $Ba^{2+}$, $Fe^{2+}$, $Sr^{2+}$, $Ra^{2+}$, $Cu^{2+}$, $Ag^+$, $Zn^{2+}$, $Ni^{2+}$, or $Co^{2+}$ for proton before the hydrogen reduction process, in more preferably, the further treatment of substituting $K^+$, $Na^+$, $Li^+$, $Rb^+$, $Cs^+$, $Mg^{2+}$, $Ca^{2+}$, $Ba^{2+}$, $Fe^{2+}$, $Sr^{2+}$, $Ra^{2+}$, $Cu^{2+}$, $Ag^+$, $Zn^{2+}$, $Ni^{2+}$, or $Co^{2+}$ for proton before the ion exchange process.

Figure 4:
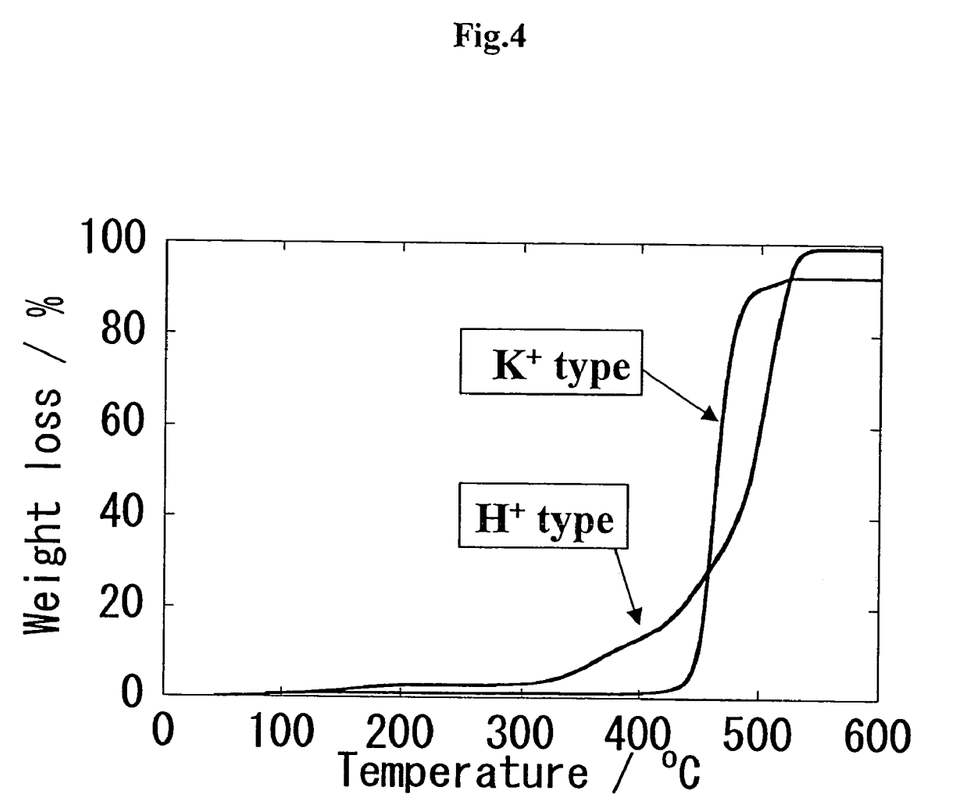
FIG. 4 shows TG curves for the proton conductive polymer and the one after substitution of $K^+$ ion for $H^+$ ion.
Figure 5:
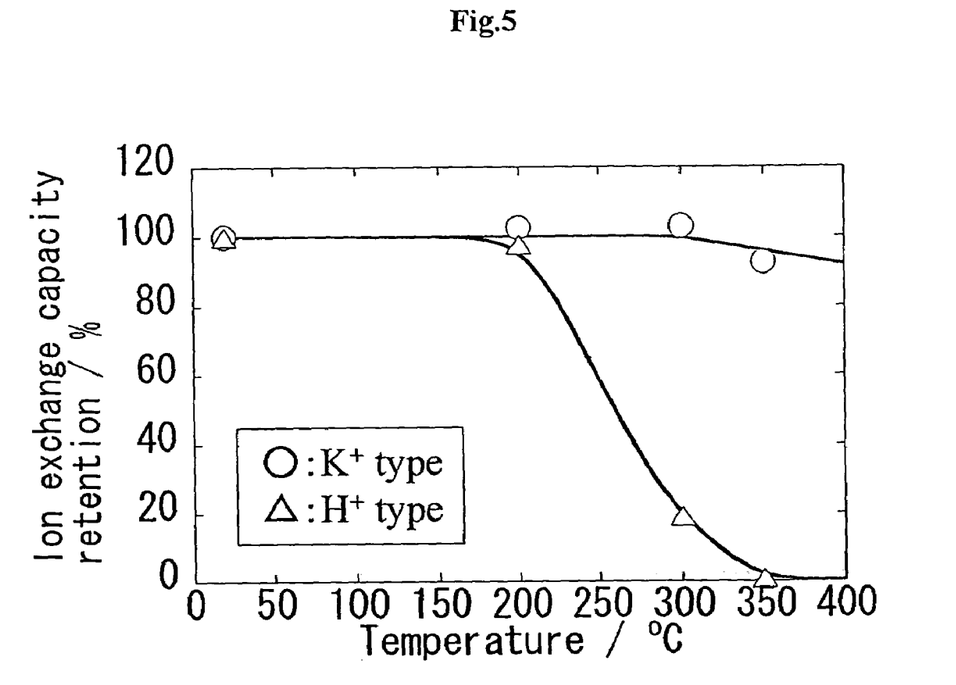
FIG. 5 shows the change of the ion exchange capacity retention for the proton conductive polymer and the one after substitution of $K^+$ ion for $H^+$ ion with the temperature increase.

The extension of the aging temperature to the higher one is considered to accelerate the alloy formation such as Pt—Ru binary system. The substitution of the other element besides H+ion as the counter ion in the cluster of the proton conductive polymer ion has been investigated on the effect of the heat-resistant property of its polymer. The TGA curve for proton conductive polymer of Nafion with the substitution of $K^+$ ion is shown in FIG. 4 under condition of atmosphere $N_2$ at the heating rate 10° C. $min^{-1}$. The weight loss for $K^+$ ion type is found out to be observed beyond 430° C., though the no substitution proton conductive polymer $H^+$ ion type begins to start beyond 150° C. and the large weight loss is observed beyond 320° C. The ion exchange capacity is considered to be closely related to the performance of PEFC. The value of the ion exchange capacity for proton conductive polymer of Nafion with the substitution of $K^+$ ion is also shown in FIG. 5 under the condition of atmosphere $N_2$ during 2 hours at the various temperatures. The retention value of ion exchange capacity for $K^+$ ion type is held up to 400° C., though the slight decrease of the value is observed beyond 300° C. On the contrary, the value for $H^+$ ion type drastically decreases beyond 180° C. and no capacity is observed at the temperature of 350° C.

From the analysis of the test results, the substitution of the other element besides $H^+$ ion as the counter ion in the cluster of the proton conductive polymer ion seems to show the something effect of the heat-resistant property of its polymer.

EXAMPLES

The some examples according to the present are concretely described below.

Example 1

A mixture of 54 g of a proton conductive polymer resin solution (5 mass % Nafion solution manufactured by Aldrich Inc.) and 5 g of carbon powder (Vulcan XC-72 manufactured by Cabot Corp.) was kneaded and concentrated with heating at 65° C. to make a paste. The paste was then applied to FEP (Tetra fluoroethylene hexa fluoro propylene copolymer) sheet to form the paste layer followed by drying at 25° C. The dry layer was immersed into mixed aqueous solution containing $3.8 \times 10^{-2}$ mol $l^{-1}$ of $[Pt(NH_3)_4]Cl_2$ and $1.3 \times 10^{-2}$ mol $l^{-1}$ of $[Ru(NH_3)_6]Cl_3$ for 24 hours to substitute $[Pt(NH_3)_4]^{2+}$ ion and $[Ru(NH_3)_6]^{3+}$ ion for proton in the cluster of proton conductive polymer by ion-exchange reaction followed by washing process with de-ionized water. The platinum and ruthenium ion was reduced by hydrogen atmosphere at 200° C. for 24 hours to form the premature metallic platinum-ruthenium binary alloy. The layer was then immersed in $5.0 \times 10^{-1}$ mol $l^{-1}$ of KOH for 24 hours to substitute $K^+$ ion for proton in the cluster of polymer conductive polymer resin followed by washing with de-ionized water. Finally, the layer was hold at the temperature of 300° C. for 2 hours as the aging process to form the platinum-ruthenium binary alloy. Thus, the anode catalyst layer with Pt—Ru 0.022 mg $cm^{-2}$ according to the present invention was prepared. Furthermore, the Membrane Electrode Assembly (MEA) with 5 $cm^2$ was then prepared by the hot-pressing of the cathode catalyst layer with platinum supported carbon of 0.3 mg $cm^{-2}$ catalyst loading level and the anode catalyst layer on the both sides of polymer electrolyte membrane (Nafion 115). The single PEFC (A) was composed of the following serial constitution parts; anode flow plate/gas diffusion backing/MEA/gas diffusion backing/cathode flow plate. The gas diffusion backing was used of carbon paper of 0.2 mm thick treated with PTFE dispersion solution followed by sintering at 380° C. for 15 min. under $N_2$ atmosphere for hydrophobic property.

Example 2

The single PEFC (B) according to the present invention was prepared using the anode catalyst layer of Pt—Ru 0.022 mg $cm^{-2}$ in the same process as the case of example 1 besides $5.0 \times 10^{-1}$ mol $l^{-1}$ of NaOH instead of $5.0 \times 10^{-1}$ mol $l^{-1}$ KOH.

Example 3

The single PEFC(C) according to the present invention was prepared using the anode catalyst layer with Pt—Ru 0.022 mg $cm^{-2}$ in the same process as the case of example 1 besides $5.0 \times 10^{-1}$ mol $l^{-1}$ of $Ca(OH)_2$ instead of $5.0 \times 10^{-1}$ mol $l^{-1}$ KOH, though the colloidal particle was observed.

Example 4

The single PEFC (D) according to the present invention was prepared using the anode catalyst layer with Pt—Ru 0.022 mg $cm^{-2}$ in the same process as the case of example 1 besides $5.0 \times 10^{-1}$ mol $l^{-1}$ of $Mg(OH)_2$ instead of $5.0 \times 10^{-1}$ mol $l^{-1}$ KOH, though the colloidal particle was observed.

Example 5

The single PEFC (E) according to the present invention was prepared using the anode catalyst layer with Pt—Ru 0.022 mg cm$^{-2}$ in the same process as the case of example 1 besides $5.0 \times 10^{-1}$ mol l$^{-1}$ of Fe(OH)$_2$ instead of $5.0 \times 10^{-1}$ mol l$^{-1}$ KOH, though the colloidal particle was observed.

Comparative Example 1

The single PEFC (F) was also prepared using the anode catalyst layer with Pt—Ru 0.022 mg cm$^{-2}$ in the same process as the case of example 1 without the process of immersion in $5.0 \times 10^{-1}$ mol l$^{-1}$ of KOH for 24 hours to substitute K$^+$ ion for proton in the cluster of polymer conductive polymer resin followed by washing with de-ionized water.

Figure 6:
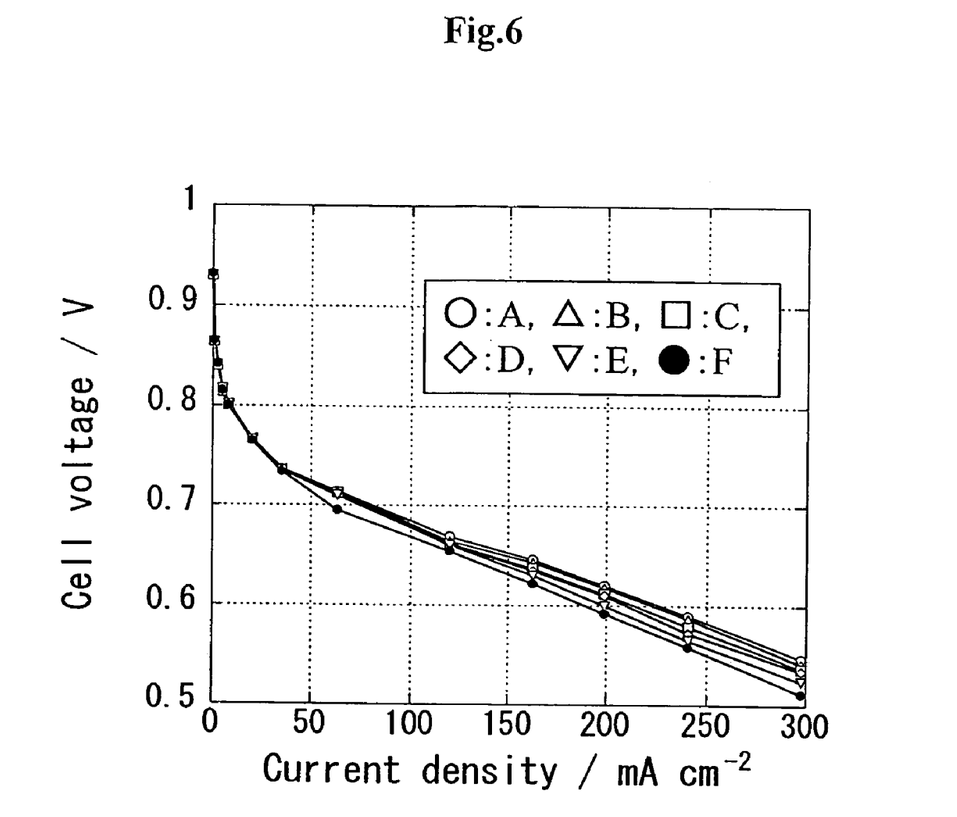
FIG. 6 shows the polarization curves for PEFC with the various substitution elements for proton in ion exchange resin according to the present invention.

The PEFC (A), (B),(C),(D),(E), and (F) were evaluated under the condition of air and fuel of H$_2$ 80% containing 10 ppmCO at the temperature of 80° C. The polarization curves are shown in FIG. 6.

It was verified that the PEFC (A), (B), (C), (D), and (E) according to the present invention is superior to the existing PEFC (F). This means that the additional processes of treatment of substituting K$^+$, Na$^+$, Mg$^{2+}$, Ca$^{2+}$, or Fe$^{2+}$ for proton before the hydrogen reduction process according to the present invention is remarkably effective to shorten the aging time at the high temperature of 300° C.

Figure 7:
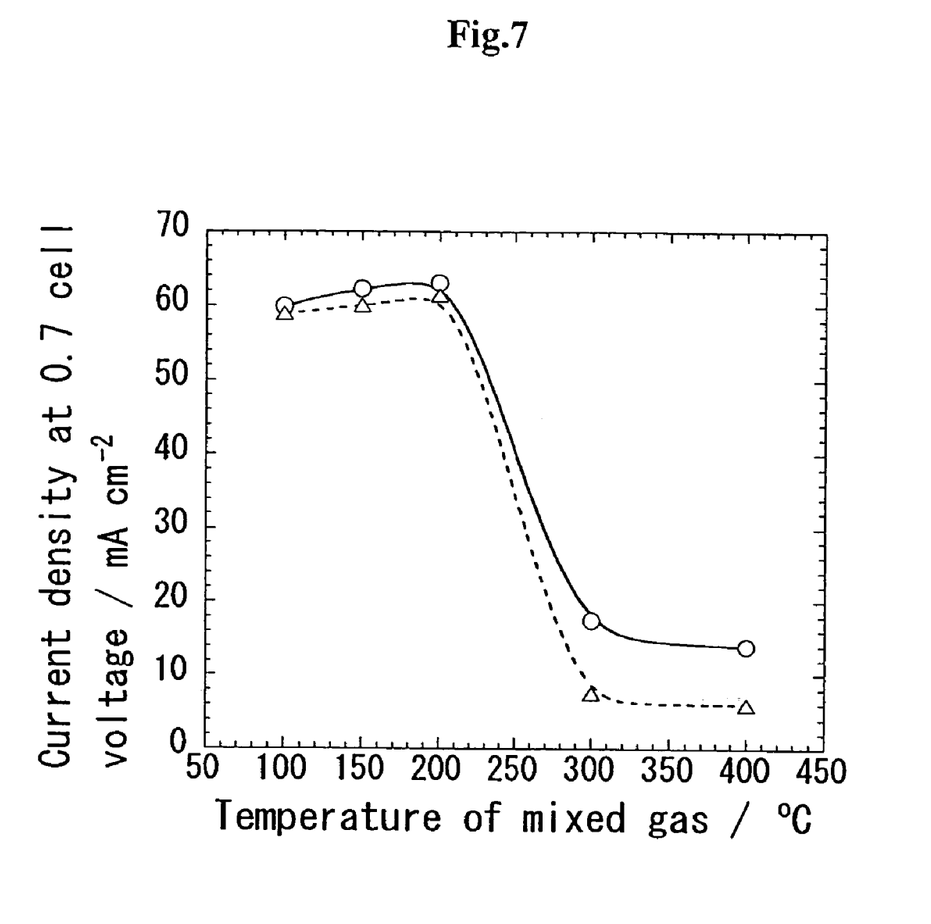
FIG. 7 shows relationship the current density at 0.7 Voltage for PEFC with different reduction temperatures according to the present invention under the condition of the mixed gas ($N_2$:$H_2$=90:10) atmosphere.

In order to clear the aging temperature range showing the effect of the additional process according to the present invention, the single PEFC with the different aging temperatures was investigated. The single cells were prepared in the same process as the case of example 1 and comparative example 1 except of different aging temperatures. The relation of current density at 0.7V measured by polarization curves and aging temperature is shown in FIG. 7.

It was turned out that the additional process is effective in the wide range of temperature range from 100° C. to 400° C.

Example 6

A mixture of 54 g of a proton conductive polymer resin solution (5 mass % Nafion solution manufactured by Aldrich Inc.) and 5 g of carbon powder (Vulcan XC-72 manufactured by Cabot Corp.) was kneaded and concentrated with heating at 65° C. to make a paste. The paste was then applied to FEP (Tetrafluoroethylene hexafluoropoylene copolymer) sheet to form a paste layer followed by drying at 25° C. The layer was then immersed in $5.0 \times 10^{-1}$ mol l$^{-1}$ of KOH for 24 hours to substitute K$^+$ ion for proton in the cluster of polymer conductive polymer resin followed by washing with de-ionized water subsequent to heat treatment of 300° C. for 2 hours as the pre-treatment. The dry layer was immersed into mixed aqueous solution containing $3.8 \times 10^{-2}$ mol l$^{-1}$ of [Pt(NH$_3$)$_4$]Cl$_2$ and $1.3 \times 10^{-2}$ mol l$^{-1}$ of [Ru(NH$_3$)$_6$]Cl$_3$ for 24 hours to substitute [Pt(NH$_3$)$_4$]$^{2+}$ ion and [Ru(NH$_3$)$_6$]$^{3+}$ ion for proton in the cluster of proton conductive polymer by ion-exchange reaction followed by washing process with de-ionized water. The platinum and ruthenium ion was reduced by hydrogen atmosphere at 200° C. for 24 hours to form the premature metallic platinum-ruthenium binary alloy. The layer was again immersed in $5.0 \times 10^{-1}$ mol l$^{-1}$ of KOH for 24 hours to substitute K$^+$ ion for proton in the cluster of polymer conductive polymer resin followed by washing with de-ionized water as the post-treatment. Finally, the layer was hold at the temperature of 300° C. for 2 hours as the aging process to form the platinum-ruthenium binary alloy. Thus, the anode catalyst layer with Pt—Ru 0.022 mg cm$^{-2}$ according to the present invention was prepared. Furthermore, the Membrane Electrode Assembly (MEA) with 5 cm$^2$ was then prepared by the hot-pressing of the cathode catalyst layer with platinum supported carbon of 0.3 mg cm$^{-2}$ catalyst loading level and the anode catalyst layer on the both sides of polymer electrolyte membrane (Nafion 115). The single PEFC (G) according to the present invention was composed of the following serial constitution parts; anode flow plate/gas diffusion backing/MEA/gas diffusion backing/cathode flow plate. The gas diffusion backing was used of carbon paper of 0.2 mm thick treated with PTFE dispersion solution followed by sintering at 380° C. for 15 min. under N$_2$ atmosphere for hydrophobic property.

Figure 8:
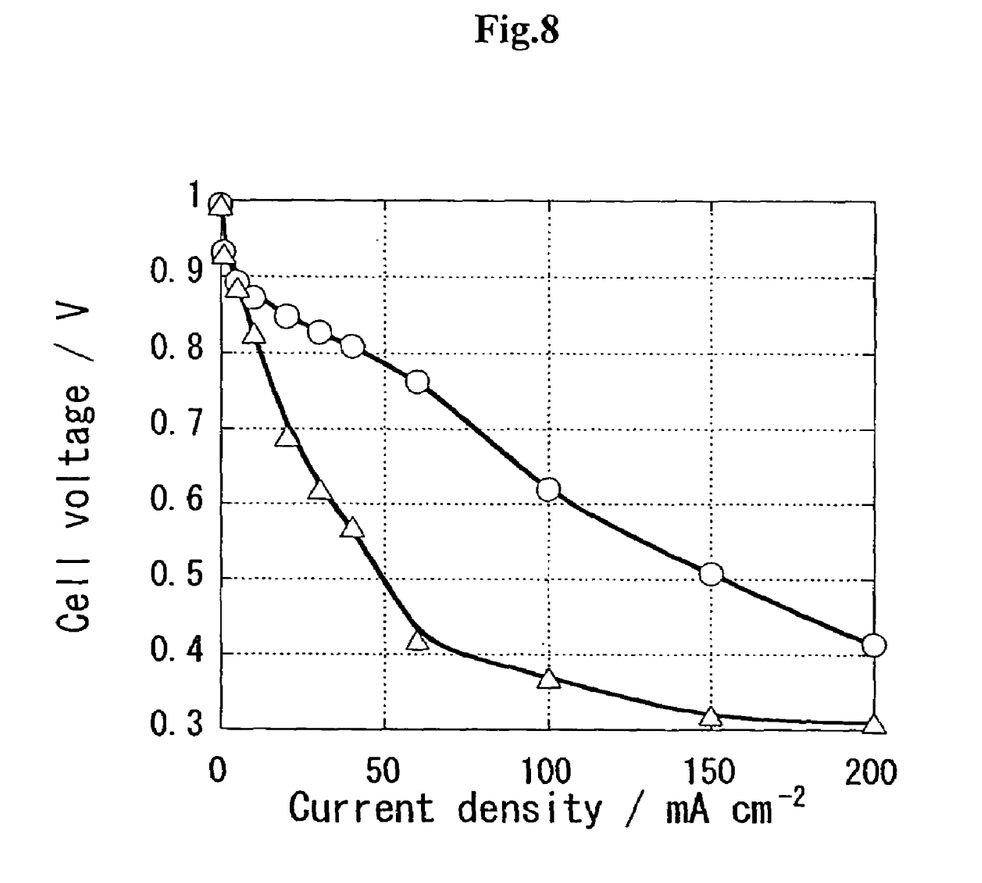
FIG. 8 shows the comparison of the polarization curve for PEFC with Pt—Ru binary alloy for anode according to the present invention with the existing one.

In order to clear this additional pre-treatment of K$^+$ ion substitution for proton before the hydrogen reduction process. The polarization curves for single cell (G) with the both treatments and single cell (A) with only the post-treatment in Example 1, were investigated. These polarization curves are shown in FIG. 8. It was turned out that the performance of PEFC(G) with the both treatments is superior to that of single cell (A) with only the post-treatment. The reason of the effect of the additional pre-treatment is not certain at the present time. However, the analysis by gas chromatography after the pre-treatment process showed the trace of the existence of SO$_2$ gas. This experimental fact implies that the very small amount of harmful impurity of sulfa and the like may be expelled from the proton conductive polymer material at the higher temperature beyond 200° C. The amount of the impurity something seems to be increased with the temperature increase up to 400° C.

In the examples described above, the elements such as K$^+$, Na$^+$, Mg$^{2+}$, Ca$^{2+}$, or Fe$^{2+}$ as substitution ion for proton in the cluster of proton conductive polymer is selected for the explanation of this present invention. However, another element such as Rb, Cs, Fr, Sr, Ra, Cu, Ag, Zn, Ni, or Co was to be applied for this invention. Furthermore, the above-mentioned mixed elements more than or equal to two were capable. Namely, as for the alloy metal according to the present invention, the binary alloy of Pt—Ru as Examples was used, however, the alloy is not limited to the binary alloy, but is to be applied for ternary alloy or more. The preferable alloy is Pt as one composition's element. As for the atmosphere of the pre- and post-treatments, the hydrogen gas was used in the Examples, the other atmosphere such as inert gas or the mixed gases with hydrogen were also to be applied to this invention. Needless to say, the catalyst layer was used for the pre- and post treatment of the Examples according to the invention, the carbon powder materials mixed with proton conductive polymer is to be applied to the invention. Finally, in the example, a perfluorosulfonic acid of Nafion was used as the proton conductive materials for the example, the other materials such as crosslinked fluorinated-polymer, crosslinked polytetrafluoroethylene, polyvinylphosphoric acid, sulfonated polyethers, sulfonic acid group-containing aromatic polymers, and sulfonated polyimide, are to be applied to this invention.

What is claimed is

1. A process for the production of the catalyst for a fuel cell comprising:
    a first step of absorbing a cation of catalyst metal element into the proton conductive polymer resin in a mixture of said proton conductive polymer resin and carbon particle by ion-exchange reaction between the cation and a counter ion of said proton conductive polymer resin;

a second step of chemically reducing the cation absorbed in said proton conductive polymer risin;

a third step of absorbing $K^+$, $Na^+$, $Li^+$, $Rb^+$, $Cs^+$, $Ca^{2+}$, $Ba^{2+}$, $Sr^+$, or $Ra^{2+}$ into said proton conductive polymer resin; and a fourth step of aging process at a temperature range between 100° C. and 400° C.

2. A process for the production of the catalyst for a fuel cell comprising:

a first step of $K^+$, $Na^+$, $Li^+$, $Rb^+$, $Cs^+$, $Ca^{2+}$, $Ba^{2+}$, $Sr^{2+}$, or $Ra^{2+}$ into a proton conductive polymer resin in a mixture of said proton conductive polymer resin and carbbon particle followed by heating at temperature range between 100° C. and 400° C.;

a second step of absorbing a cation of catalyst metal element into said proton conductive polymer resin in a mixture of said proton conductive polymer resin and said carbon particle by ion-exchange reaction between said cation and a counter ion of said proton conductive polymer resin;

a third step of chemically reducing the cation absorbed in said proton conductive polymer resin;

a fourth step of absorbing $K^+$, $Na^+$, $Li^+$, $Rb^+$, $Cs^+$, $Ca^{2+}$, $Ba^{2+}$, $Sr^{2+}$, or $Ra^{2+}$ into said proton conductive polymer; and a fifth step of aging process at a temperature range between 100° C. and 400° C.

3. A process for the production of a catalyst for a fuel cell according to claim 1, wherein said temperature range is between 200° C. and 400° C.

4. A process for the production of a catalyst for a fuel cell according to claim 2, wherein said temperature ranges for said first and fifth steps are between 200° C. and 400° C.

5. A process for the production of a catalyst for a fuel cell according to any of claims 1, 2, 3 or 4, wherein said catalyst metal element belongs to platinum group.

6. A process for the production of a catalyst for a fuel cell according to any one of claims 1, 2, 3 or 4, wherein said catalyst metal element comprises two or more elements belonging to platinum group.

7. A process for the production of a catalyst for a fuel cell according to claim 5, wherein said catalyst metal element comprises two or more elements belonging to platinum group.

8. A process for the production of a catalyst for a fuel cell according to any one of claims 1, 2, 3 or 4, wherein said catalyst metal element comprises one element belonging to platinum group and one element belonging to a group other than platinum group.

9. A process for the production of a catalyst for a fuel cell according to claim 5, wherein said catalyst metal element comprises one element belonging to platinum group and one element belonging to a group other than platinum group.

10. A process for the production of a catalyst for a fuel cell according to any one of claims 1, 2, 3 or 4, wherein said catalyst metal element comprises Pt and Ru.

11. A process for the production of a catalyst for a fuel cell according to claim 5, wherein said catalyst metal element comprises Pt and Ru.

12. A process for the production of a catalyst for a fuel cell according to claim 1, wherein an atmosphere of said aging process is hydrogen, inert gas, or their mixed gases.

13. A process for the production of a catalyst for a fuel cell according to claim 12, wherein said inert gas is nitrogen gas.

14. A process for the production of a catalyst for a fuel cell according to claim 2, wherein atmospheres for said first and fifth steps are hydrogen, inert gas, or their mixed gases.

15. A process for the production of a catalyst for a fuel cell according to any one of claims 1, 2, 3 or 4, wherein said catalyst is for anode.

* * * * *